Patented Aug. 6, 1946

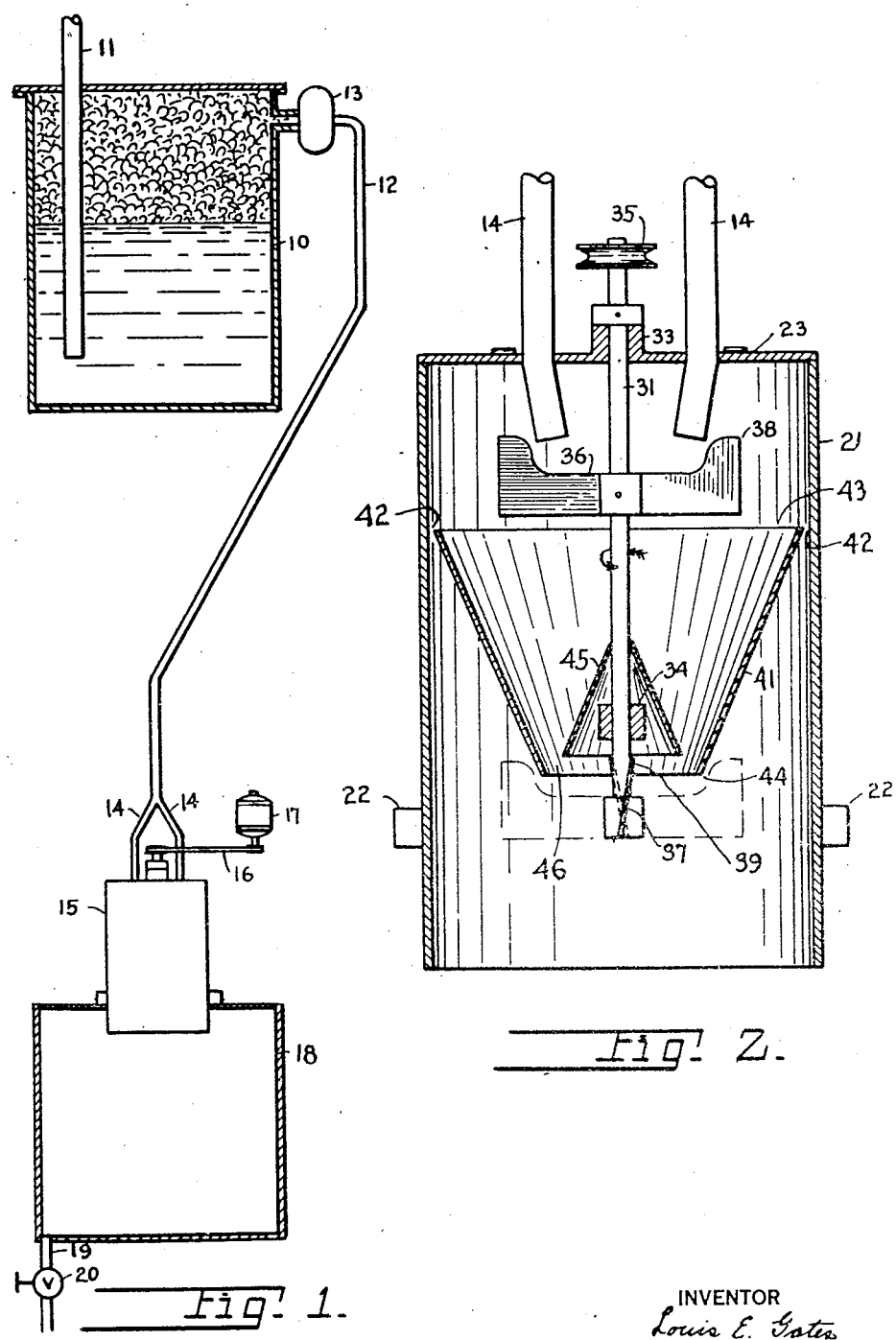

2,405,138

UNITED STATES PATENT OFFICE 2,405,138

APPARATUS FOR BREAKING FOAM

Louis E. Gates, Canton, N. C., assignor to The Champion Paper and Fibre Company, Canton, N. C., a corporation of Ohio Original application May 20, 1941, Serial No. 394,382, now Patent No. 2,366,513, dated January 2, 1945. Divided and this application August 19, 1944, Serial No. 550,267

12 Claims. (Cl. 252—361)

This invention relates to methods and apparatus for breaking foam. It has a particular utility in connection with the sulphate process of pulping resinous woods. In that process resin soaps are formed which cause large quantities of the foam on the black liquor. This foam is very stable and its disposal constitutes a major problem in pulping some types of wood. It is particularly abundant and troublesome where vacuum type filters are used to separate the pulp from the liquor since large quantities of air are sucked in with the liquor by these devices. The foam further carries most of the resins as well as other valuable chemicals, which are lost unless the foam is broken and converted to a liquid which can be handled in the recovery plant.

The primary object of this invention is thus the provision of an easily operated and reliable method of converting stubborn and stable types of foam into a liquid which can be handled conveniently.

An allied object is the provision of an apparatus for this purpose which shall be simple, effective, small in size, and convenient in handling and in operation.

Other detailed objects of the invention will be apparent from the following description.

I have found that foam, even of the stable and persistent type described, can be substantially completely broken by, preferably, separating it from the parent liquid and then subjecting it in the form of a relatively small stream, projected through an otherwise substantially foam-free atmosphere, to impact against a substantially foam-free surface and then throwing it through an otherwise substantially foam-free atmosphere for a material distance, to allow the component parts of the foam to separate, against an advantageously imperforate and substantially foam-free surface. In order to assure complete breaking of all of the foam I find it advantageous to separate any residual unbroken foam from the liquor resulting from the breaking of the major part of the foam, and to subject this residual foam to a breaking operation like that already described. I have found that by this process I can convert foam which otherwise constitutes only a troublesome waste product, into a commercially foam-free liquor which can be conveniently handled for the recovery of valuable chemicals and by-products.

This process can, I find, be conveniently carried out by the use of two paddles which rotate rapidly one above the other on a substantially vertical axis in a cylindrical housing, the inside diameter of which is materially larger than the diameter of the paddles. One or more pipes or spouts, whose diameter is small relative to the radius of the paddles, introduce one or more streams of the foam downwardly into the plane of rotation of the upper paddle, in a zone intermediate its axis and the circumference of its path. Just below this paddle and above the lower paddle is a funnel shaped member whose upper rim is spaced a small and substantially uniform distance from the inside wall of the housing. Liquid can thus run down the housing wall while any residual foam is caught by the funnel and directed into the path of the lower paddle in a zone between its axis and the circumference of its path. The liquid resulting from the breaking of the foam flows from the bottom of the housing into a suitable container below.

The invention will be further described with reference to the accompanying drawing illustrating one embodiment thereof and in which:

Fig. 1 is a diagrammatic representation of the arrangement of a system for disposal of foam.

Fig. 2 is a cross sectional view of the foam breaking apparatus per se.

Referring to the drawing, foamy liquor, which may be black liquor from the sulphate pulping process, is introduced into a tank 10 through a pipe 11. From this tank the foam, with only its entrained liquid, flows out through a pipe 12 by virtue of pressure in tank 10. If this pressure is insufficient, a pump 13, advantageously a positive pressure pump such as a gear pump, may be provided in pipe 12. Branches 14 of pipe 12 deliver foam to the foam breaker 15, which may be driven by a belt 16 and motor 17. There the foam is converted to liquid which flows into a tank 18 from which it may be withdrawn through a pipe 19 under control of a valve 20, and passed if desired to a recovery plant where its chemical content may be recovered.

The foam breaking devices themselves are shown in detail in Fig. 2. A cylindrical housing 21 is provided with external support brackets 22 and a suitably hinged cover 23. Mounted for rotation within housing 21 is a shaft 31 carried substantially coaxially with housing 21 by bearings 33 and 34, and carrying a pulley 35 by which it may be driven by belt 16 and motor 17. Within housing 21, paddles 36 and 37 are fixedly mounted on shaft 31. The diameter of these paddles, i. e. the diameter of their disc-shaped paths, is materially smaller than the internal diameter of housing 21 thus leaving an ample clearance around paddles 36 and 37. The blades of these paddles advantageously have a slight pitch, as illustrated in Fig. 2, in a direction which tends to impel the foam downward. This aids in maintaining continuity of flow through the machine and tends to prevent foam from being thrown upward into the space above the paddle where it otherwise might tend to accumulate at a location where a foam-free atmosphere is desired, and thus impair the efficiency of the device. The foam inlet pipes 14 direct the foam downwardly through the plane of rotation of upper paddle 36. Foam inlet pipes 14 should be small in diameter relative to the radius of paddle 36, and should not be so great in number, with reference to the rate of flow of foam through them, that paddle 36 is compelled to operate in an atmosphere of foam and thereby to largely lose its effectiveness. They are advantageously equal in number and distribution to the number of radial blades in paddle 36 in order that the impact load may be more perfectly balanced. The paddle 36 may advantageously have upwardly widened ends 38 which extend above the outlets of pipes 14 so that any foam which may be deflected horizontally will be struck and broken before passing beyond the reach of the paddle.

Below paddle 36 is a funnel shaped member 41 mounted substantially coaxially within housing 21 but preferably leaving a small and substantially uniform clearance 42 between its upper rim 43 and the inner surface of housing 21. This clearance allows liquid which results from breaking of the foam, to run down the walls of housing 21 while any residual foam is deflected into the funnel 41. The outlet 44 of funnel 41 is disposed immediately above the lower paddle 37. Advantageously a small cone 45 surrounds shaft 31 at the bottom of funnel 41 and provides an annular outlet 46 at the bottom of funnel 41, which delivers the residual foam to paddle 37 in a zone intermediate its axis of rotation and the circumference of its path. The paddle 37 advantageously also has upwardly widened ends 39, which extend above the mouth 44 of funnel 41 (as shown by the broken lines which indicate the path of paddle 37), as and for the same reason that the ends 38 of paddle 36 extend above the outlets of pipes 14.

The operation of the device is as follows: The shaft 31 with paddles 36 and 37 is rotated rapidly by the motor 17. Foam, with only its entrained liquid, is introduced in a downward direction through pipes 14 at a velocity so related to the rate of rotation of paddles 36 and 37 that the undeflected foam does not pass through the path of the paddle before being struck by the next blade, so that impact against all undeflected parts of the foam is assured. This initial impact is thought to break most of the foam. The resulting liquid together with any unbroken foam is thrown by centrifugal force outward, off of the paddles, through the air space where the component parts are thought to separate, and against the walls of housing 21, where most of the remaining foam appears to be broken. The liquid resulting from breaking of the foam runs down the walls through the narrow annular space 42 while any residual foam is caught in funnel 41 and directed downward through annular space 46 into the path of the lower paddle 37 which functions in the manner already described with reference to paddle 36.

While it is possible, on the one hand, to shorten the device by omitting the lower paddle 37, or, on the other hand to lengthen the device and provide additional paddles, I find that in practice the use of a second paddle 37 is justifiable as a safety measure in case the foam is not completely broken by the first paddle 36, but that these two stages are ordinarily ample to break the most stubborn types of foam on which I have so far used the device, so that additional stages are in general not necessary.

It should be noted that in order to break the foam, instead of rendering it finer and more stable by the beating action, I provide that the housing is filled with air rather than foam, that except for the relatively small streams of foam, the paddles operate in a substantially foam-free atmosphere, and that furthermore the surfaces of the paddles and the walls of the housing are maintained substantially free from the presence of foam which would cushion the impact and hinder breaking of the foam.

In one example of successful foam breaking, a device similar to that illustrated in Fig. 2 was used. The housing 21 was about 20 inches in diameter and 30 inches long. The paddles 36 and 37 were each composed of two diametrically opposite blades extending 6 inches from the center of the shaft 31. The width of each was 2 inches at the center and 4 inches at the widened ends 38 and 39. The blades were pitched at an angle of approximately 10 degrees with the axis of shaft 31 and were rotated at a speed of about 1150 R. P. M. The funnel 41 was approximately 12 inches in height while the clearance 42 was somewhat under ¼ inch. The annular outlet 46 of funnel 41 was about 6 inches inside and 8 inches outside diameter. There were two 1½ inch inlet pipes 14 set to deliver streams of foam into the path of paddle 36 at distances of about 3½ inches from the axis of shaft 31. Foam was thus introduced to the device at a rate of about 90 gallons per minute, and substantially foam-free liquid flowed from the bottom of the device at a rate between 1 and 5 gallons per minute, depending on the composition of the foam. A troublesome, difficultly-disposable residue was thereby converted into a form which could easily be handled for the recovery of the valuable by-products contained therein.

The term paddle as used in the appended claims refers to one or more blades located in substantially the same axial position.

This application is a division of my co-pending application Serial No. 394,382, filed May 20, 1941, entitled Method and apparatus for breaking foam, now Patent No. 2,366,513.

I claim:

1. A device for breaking foam, comprising: a rotatable paddle; means for rapidly rotating said paddle; a substantially imperforate target surrounding the path of rotation of said paddle and separated therefrom by a substantial clearance; means for removing foam from its parent liquid; and means for introducing a stream of said foam into the path of rotation of said paddle at a location intermediate the axis of rotation and the circumference of the path of said paddle.

2. A device for breaking foam, comprising: a plurality of rotatable paddles; means for rapidly rotating said paddles; a substantially imperforate target surrounding the path of rotation of each of said paddles and separated therefrom by a substantial clearance; means for introducing foam into the path of one of said paddles, at a location intermediate its axis of rotation and the circumference of its path; means for separating broken from unbroken foam; and means for introducing the unbroken foam, so separated, into the path of rotation of the succeeding paddle at a location intermediate its axis of rotation and the circumference of its path.

3. A device for breaking foam, comprising: a plurality of coaxial rotatable paddles; means for rapidly rotating said paddles; a substantially imperforate cylindrical target surrounding and substantially coaxial with said plurality of paddles, and separated therefrom by a substantial clearance; means for introducing foam sidewise into the path of rotation of the first of said paddles; means for separating residual foam from the liquor from foam broken by one of said paddles; and means for introducing the residual foam sidewise into the path of rotation of the succeeding paddle.

4. A device for breaking foam, comprising: a cylindrical housing; a paddle rotatably mounted therein, substantially coaxial therewith and formed to leave a substantial clearance between its tip and the walls of said housing; means for removing foam from its parent liquid; means for projecting a stream of said foam eccentrically through the path of rotation of said paddle; and means for rapidly rotating said paddle.

5. A device for breaking foam, comprising: a cylindrical housing open at one end; a paddle rotatably mounted therein and substantially coaxial therewith; the diameter of the path of said paddle being materially smaller than that of said housing; means for rapidly rotating said paddle; a spout whose diameter is small relative to the radius of said paddle, which opens adjacent and in close proximity to said paddle and is directed towards a zone substantially midway between the axis of rotation and the circumference of the path of said paddle, whereby a stream of foam can be fed into the path of rotation of said paddle.

6. A device for breaking foam, comprising: a substantially vertical housing; a paddle rotatably mounted therein substantially coaxial therewith and formed to leave a substantial clearance between the tip of said paddle and the walls of said housing; means for projecting a stream of foam eccentrically and downwardly through the path of rotation of said paddle; a funnel mounted in said housing below said paddle, a small and substantially uniform clearance being provided between the top of said funnel and the walls of said housing, a paddle rotatably mounted in and substantially coaxial with said housing, below the mouth of said funnel and with a substantial clearance between the tip thereof and the walls of said housing, and means for rapidly rotating said paddles.

7. A device for breaking foam, comprising: a substantially vertical housing; two paddles rotatably mounted therein and substantially coaxial therewith, a substantial clearance being provided between the tips of said paddles and the walls of said surrounding housing; at least one spout entering said housing above said paddles and adapted to direct a stream of foam downwardly through the path of rotation of the uppermost of said paddles in a zone intermediate its axis of rotation and the circumference of its path; a funnel shaped member fixedly mounted in said housing between said paddles, its upper rim being separated from the walls of said housing by a small and substantially uniform clearance and its lower end provided with an annular opening substantially centrally located over the lowermost of said paddles; and means for rapidly rotating said paddles.

8. A device for breaking foam, comprising: a substantially vertical cylindrical housing; a shaft rotatably mounted substantially centrally in said housing; a paddle mounted on said shaft for rotation within said housing, the diameter of the path of said paddle being materially smaller than the internal diameter of said housing; a spout for directing a stream of foam downwardly through the disc-shaped path of said paddle, whereby, when the paddle is rotating rapidly the foam in said stream will be forcibly struck and thrown by centrifugal force against the walls of said housing; a funnel shaped member mounted in said housing below said paddle with its upper rim spaced a small and substantially uniform distance from the walls of said housing whereby liquid can run down said walls while foam will be deflected into said funnel shaped member; a second paddle mounted on said shaft below the mouth of said funnel for rotation within said housing, the diameter of the path of said paddle being materially smaller than the internal diameter of said surrounding housing; and means for rapidly rotating said shaft and paddles.

9. The device of claim 5 in which the paddle has a slight pitch in a direction which tends to impel the foam in a direction to carry it through the device.

10. The device of claim 6 in which the paddles have a slight pitch in a direction which tends to impel the foam in a downward direction.

11. The device of claim 5 in which the ends of the paddle blades are widened backwardly to a degree to overlap the outlet of the spout.

12. The device of claim 8 in which the ends of the paddles are widened upwardly to extend above the level at which foam is introduced to the respective paddles, whereby the widened ends of said paddles can strike such foam as may be impelled horizontally outward by the rotating paddle.

LOUIS E. GATES.